United States Patent
Wang

(10) Patent No.: US 7,400,174 B1
(45) Date of Patent: Jul. 15, 2008

(54) CURRENT MODE INTERFACE RECEIVER WITH PROCESS INSENSITIVE COMMON MODE CURRENT EXTRACTION AND THE METHOD

(75) Inventor: Hui-Min Wang, Tainan (TW)

(73) Assignee: Himax Technologies Limited (TW)

( * ) Notice: Subject to any disclaimer, the term of this patent is extended or adjusted under 35 U.S.C. 154(b) by 0 days.

(21) Appl. No.: 11/621,918

(22) Filed: Jan. 10, 2007

(51) Int. Cl.
*H03K 19/0175* (2006.01)
(52) U.S. Cl. .......................................... 326/86; 326/68
(58) Field of Classification Search ................... 326/83, 326/86, 87, 112, 115; 327/108, 109
See application file for complete search history.

(56) References Cited

U.S. PATENT DOCUMENTS

2006/0002483 A1* 1/2006 Kim ........................... 375/257

2006/0038591 A1* 2/2006 Pan ............................. 327/108

* cited by examiner

*Primary Examiner*—Charles D. Garber
*Assistant Examiner*—Jany Tran
(74) *Attorney, Agent, or Firm*—Baker & McKenzie LLP

(57) ABSTRACT

A data communication system comprises a transmitter and a receiver. A plurality of current mode drivers at the transmitter are used to transmit clock and data signals to the receiver. A plurality of current mode sinks at the receiver are used to receive the transmitted clock and data signal. The present invention provides an improved current mode interface receiver with a process insensitive common mode current extraction circuit. The proposed common mode current extraction circuit will generate a current reference based on the received clock signal, so as to accurately interpret the received clock and data signals.

14 Claims, 3 Drawing Sheets

CURRENT MODE INTERFACE RECEIVER WITH PROCESS INSENSITIVE COMMON MODE CURRENT EXTRACTION AND THE METHOD

BACKGROUND OF THE INVENTION

1. Field of the Invention

The present invention relates generally to a receiver and more particularly to a current mode interface receiver with process insensitive common mode current extraction and the method, which may be applied in a MPL communication system.

2. Description of the Related Art

The constraints of interconnect standard in small handheld electronic devices are severe. Today's cellular handsets and PDAs demand lower power, lower number of wires and lower Electromagnetic Interference (EMI). Mobile Pixel Link (MPL), compared to the existing interface such as LVDS and RSDS, provides an optimized interface between video ports on sources and targets. Its three main attributes are: fewer wires (2 active lines), low power, and very low EMI.

To gain its benefits of low power and low EMI, MPL uses small-magnitude current signaling transmission. The two logic states are determined by the magnitude of the current that is sourced from the receiver to the transmitter. The two currents can be thought of as an AC current riding on a DC bias current. Typically the two currents are 150 µA and 450 µA and considered to be ±150 µA riding on a constant 300 µA.

MPL defines the high current (i.e. 450 µA) as a Logic Low and the low current (i.e. 150 µA) as the Logic High with reference to a DC component of 300 µA. However, due to the chip to chip process variation during the semiconductor fabrication, a first current reference Icom obtained from a first BandGap reference circuit at the transmitter may differ from a second current reference Icom+Idiff obtained from a second BandGap reference circuit at the receiver, compared to the low small-magnitude current, wherein Idiff is a delta current due to the chip to chip process variation during the semiconductor fabrication. The inconsistence between the first and the second current references will cause a wrong signal interpretation at the receiver.

In FIG. 1, a block diagram illustrates a conventional data communication system, e.g. a MPL, featuring a first Band-Gap reference circuit 21 and a second BandGap reference circuit 31, locating at the transmitter and the receiver, respectively.

As shown in FIG. 1, at the transmitter, a transmitting system 10 is coupled to a plurality of current mode drivers 22-24 and provides an input signal to each of current mode drivers 22-24. The first BandGap reference circuit 21 is coupled to each of the plurality of current mode drivers 22-24 and provides a first current reference Icom. Each of the current mode drivers 22-24 compares the first current reference Icom with the corresponding input signal from the transmitting system 10 and generates an output signal to a signal channel, respectively. Specifically, the signal channels, connecting the transmitter and the receiver, are clock and data channels. Each of the output signals from the transmitter is coupled to the corresponding current mode sink 32-34 at the receiver as an input signal. The second BandGap reference circuit 31 is coupled to a plurality of current mode sinks 32-34 and provides a second current reference Icom+Idiff. Each of the current mode sinks 32-34 compares the second current reference Icom+Idiff with the input signal from the corresponding current mode driver 22-24 and generates an output signal to a receiving system 40, respectively.

The second current reference Icom+Idiff is expected to be identical to the first current reference Icom in order to properly interpret the input signals transmitted on the signal channels. Due to the chip to chip process variation during the semiconductor fabrication, the first current reference obtained from the first BandGap reference circuit 21 may differ from the second reference obtained from the second BandGap reference circuit 31. The aforementioned current references' inconsistencies will cause wrong signal interpretation at the receiver and generate a wrong output signal that will affect the accuracy of the receiver.

Therefore, there is a need for an improved interface receiver featuring a process insensitive common mode current extraction and the method extract the DC component of a clock signal as a common mode current for all clock and data signals.

SUMMARY OF THE INVENTION

In order to overcome the disadvantages of the conventional receiver, the present invention provides an improved current mode interface receiver with a process insensitive common mode current extractor.

The current mode interface receiver comprises a plurality of current mode sinks and a common mode current extractor. The current mode interface receiver receives a clock signal transmitted from the transmitter and feeds the clock signal to the common mode current extractor which generates a DC component of the clock signal as a common mode current. The common mode current is sent to a plurality of current mode sinks to interpret the corresponding input signals from the transmitter.

An advantage of the present invention is that the invention provides a better process variation immunity during circuit operation and increases the accuracy of signals interpretation at the receiver. The present invention can be used in a MPL communication system.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

Reference is made in detail to the embodiments of the invention. While the invention is described in conjunction with the embodiments, the invention is not intended to be limited by these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, as is obvious to one ordinarily skilled in the art, the invention may be practiced without these specific details.

The preferred embodiments of the present invention disclose a current mode interface receiver with a process insensitive common mode current extractor and the method, which may be applied in a MPL communication system. The current mode interface receiver comprises a common mode current extractor and a plurality of current mode sinks. By adding the common mode current extractor to the current mode interface receiver, the current mode interface receiver receives a clock signal transmitted from the transmitter and feeds the clock signal to the common mode current extractor which generates a DC component of the clock signal and uses it as a common mode current. The common mode current will be provided to a plurality of current mode sinks at the receiver in order to interpret the corresponding input signals from the transmitter accurately.

EMBODIMENT

Figure 1:
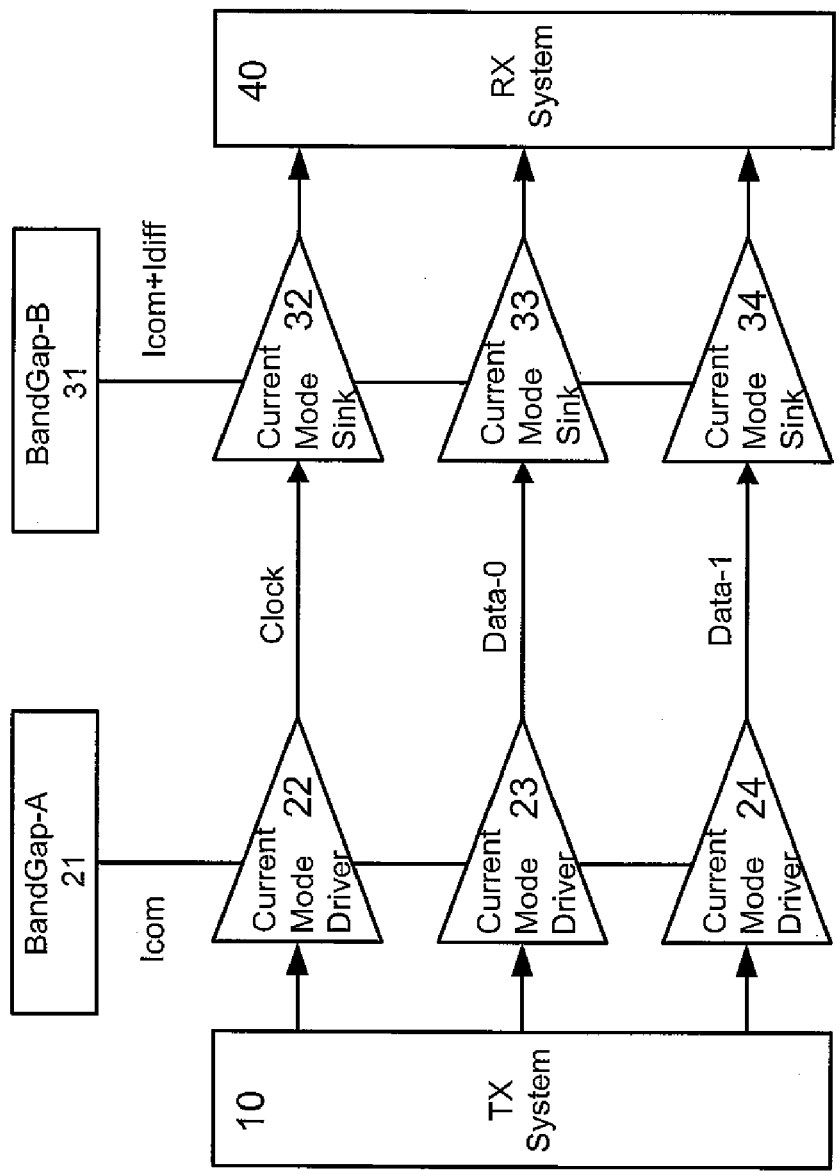
FIG. 1 illustrates a block diagram of a conventional data communication system.
Figure 2:
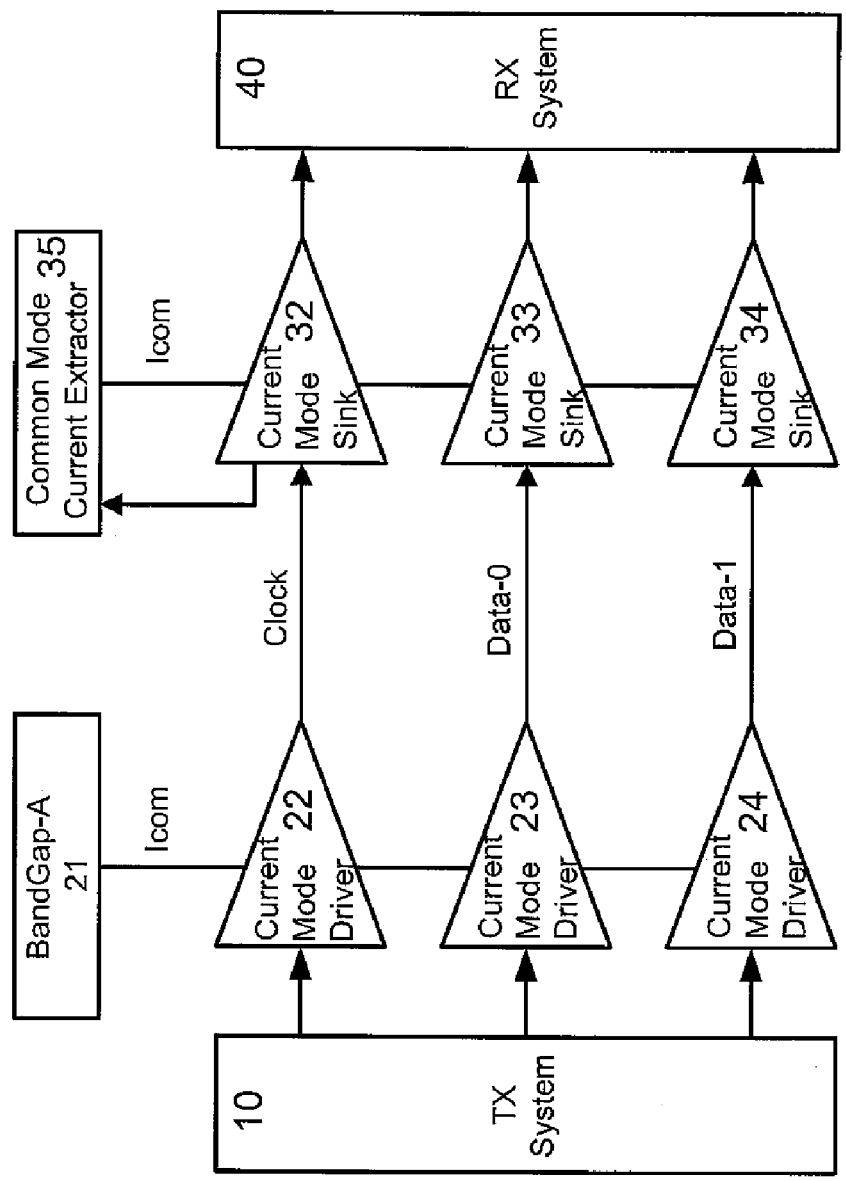
FIG. 2 illustrates a block diagram of a data communication system featuring a current mode interface receiver with a common mode current extractor in accordance with one embodiment of the present invention.

In FIG. 2, a block diagram illustrates a data communication system, e.g. a MPL communication system, featuring a current mode interface receiver with a process insensitive common mode current extractor in accordance with one embodiment of the present invention.

As shown in FIG. 2, at the transmitter, a transmitting system 10 is coupled to a plurality of current mode drivers 22-24 and provides an input signal for each of current mode drivers 22-24. A BandGap reference circuit 21 is coupled to each of the plurality of current mode drivers 22-24 and provides a first current reference Icom. Each of the current mode drivers 22-24 compares this first current reference Icom with the corresponding input signal from the transmitting system 10 and generates an output signal to a signal channel. More specifically, the signal channels, connecting the transmitter and the receiver, are clock and data channels. Each of the output signals from the transmitter is coupled to the corresponding current mode sink 32-34 at the receiver as an input signal. The current mode interface receiver comprises a common mode current extractor 35 and a plurality of current mode sinks 32-34 wherein the common mode current extractor 35 may comprise one or more low pass filters, and each of the current mode sinks may comprise a current mirror and a current mode comparator. The current mode comparator further comprises a plurality of self-bias amplifiers and an inverter. The current mode interface receiver receives a clock signal transmitted on the signal channel from the transmitter. It then feeds the clock signal to the common mode current extractor which generates a DC component of the clock signal with the one or more low pass filters and uses it as a common mode current. The common mode current will be transmitted to a plurality of current mode sinks 32-34 at the receiver. The common mode current will be compared to the corresponding input signals mirrored from the current mirror using the current mode comparator within the current mode sinks. Then each of the current mode sinks generates an output signal sent to a receiving system 40 with the current mode comparator.

Figure 3:
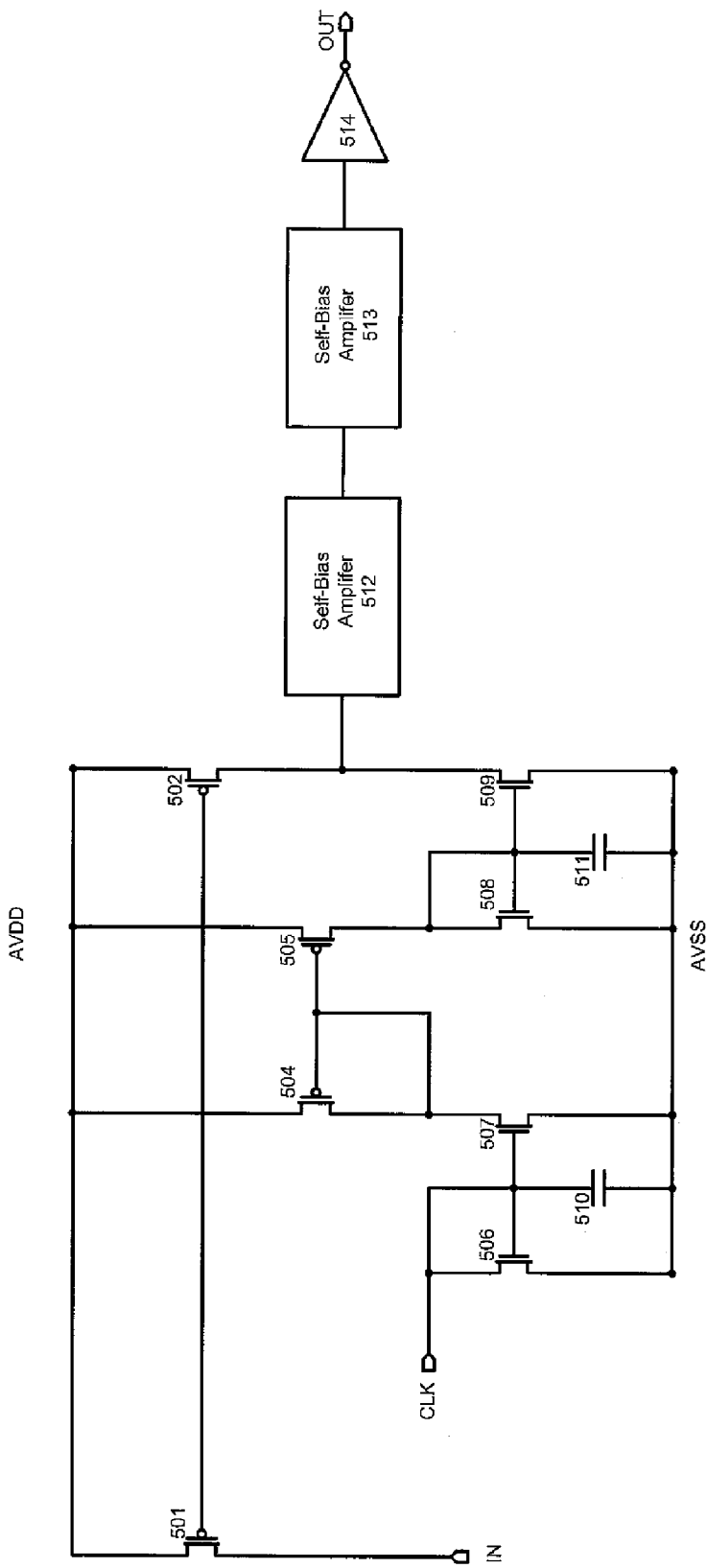
FIG. 3 illustrates a circuit diagram of a common mode current extractor and a current mode sink in accordance with one embodiment of the present invention.

FIG. 3 illustrates a circuit diagram of a common mode current extractor and a current mode sink in accordance with one embodiment of the present invention.

As shown in FIG. 3, an input signal IN is coupled to a first current mirror which comprises transistors 501 and 502. The current that flows through transistor 501 will be mirrored to transistor 502. A clock signal CLK from the transmitter is coupled to a first stage low pass filter which comprises a second current mirror which comprises transistors 506 and 507 and a capacitor 510. Therefore, the current that flows through transistor 506 will be mirrored to transistor 507 according to a predetermined ratio. The current that flows through transistor 506 is coupled to a third current mirror which comprises transistors 504 and 505. The current that flows through transistor 504, the same current that flows through transistor 507, will be mirrored to transistor 505, and it will be coupled to a second stage low pass filter which comprises a fourth current mirror which comprises transistors 508 and 509 and a capacitor 511. The current that flows through transistor 508, the same current that flows through transistor 505, will be mirrored to transistor 509 according to a predetermined ratio. The first and second low pass filters, accompanied with other supporting circuits such as the third current mirror, will generate a DC component of the clock signal CLK as a common mode current for transmission to each of the current mode sinks. Generally, more low pass filters may be used in order to provide a more stable current reference. The common mode current which flows through transistor 509 will be compared to a mirror current that flows through transistor 502 which is mirrored from the input signal IN. The compared result is coupled to a plurality of self-bias amplifiers 512, 513 that adjust the current signal swing to a power supply signal swing level, i.e. a full-swing current signal and then to an inverter 514 coupled to a last stage self-bias amplifier to invert the current signal within the current mode comparator.

Therefore, the foregoing description of the proposed current mode interface receiver with the common mode current extractor will provide a reliable common mode current and have the ability to accurately interpreting the input signals transmitted from the transmitter.

An advantage of the present invention is that the invention provides a better process variation immunity, caused by semiconductor fabrication, during circuit operation and increases the accuracy of signals interpretation at the receiver.

While the invention has been described with reference to various illustrative embodiments, the description is not intended to be construed in a limiting sense. The appended claims will cover any modifications or embodiments as may fall within the scope of the present invention.

The invention claimed is:

1. A current mode interface receiver comprising:
   a plurality of current mode sinks that 1) receive a plurality of input signals including a clock signal and 2) respectively generate a mirror current based on said received input signal; and
   a common mode current extractor that receives said clock signal and generates a common mode current based on said clock signal;
   wherein said plurality of current mode sinks receive said common mode current and respectively generate a full-swing output signal by comparing said mirror current with said common mode current.

2. The current mode interface receiver of claim 1, wherein said common mode current is a DC component of said clock signal.

3. The current mode interface receiver of claim 1, wherein said plurality of input signals comprise data signals and the clock signal.

4. The current mode interface receiver of claim 1, wherein said plurality of input signals are current signals.

5. The current mode interface receiver of claim 1, wherein said plurality of current mode sinks respectively comprises 1) a current mirror that generates said mirror current based on said received input signal and 2) a current mode comparator that generates said full-swing output signal by comparing said mirror current with said common mode current.

6. The current mode interface receiver of claim 5, wherein said current mode comparator comprises a plurality of self-bias amplifiers and an inverter.

7. The current mode interface receiver of claim 1, wherein said common mode current extractor is a two-stage low pass filter.

8. A current mode interface receiving method, said method comprising the steps of:
  providing a plurality of input signals including a clock signal to a plurality of current mode sinks;
  providing a common mode current based on said clock signal, wherein
  said plurality of current mode sinks respectively provide a mirror current based on said received input current and generate a full-swing output signal by comparing said mirror current with said common mode current.

9. The method of claim 8, wherein said common mode current is a DC component of said clock signal.

10. The method of claim 8, wherein said plurality of input signals comprise data signals and the clock signal.

11. The method of claim 8, wherein said plurality of input signals are current signals.

12. The method of claim 8, wherein said plurality of current mode sinks respectively comprises 1) a current mirror that provides said mirror current based on said received input current and 2) a current mode comparator that provides said full-swing output signal by comparing said mirror current with said common mode current.

13. The method of claim 12, wherein said current mode comparator comprises a plurality of self-bias amplifiers and an inverter.

14. The method of claim 12, wherein said common mode current is provided by a two-stage low pass filter.

* * * * *